United States Patent
Wang (10) Patent No.: US 10,932,194 B2
(45) Date of Patent: Feb. 23, 2021

(54) COMMUNICATIONS DEVICE AND METHOD AND APPARATUS FOR REDUCING POWER CONSUMPTION OF COMMUNICATIONS DEVICE

(71) Applicant: HUAWEI TECHNOLOGIES CO., LTD., Guangdong (CN)

(72) Inventor: Tongbo Wang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/067,211

(22) PCT Filed: Dec. 31, 2015

(86) PCT No.: PCT/CN2015/100118
§ 371 (c)(1),
(2) Date: Jun. 29, 2018

(87) PCT Pub. No.: WO2017/113293
PCT Pub. Date: Jul. 6, 2017

(65) Prior Publication Data
US 2019/0028970 A1   Jan. 24, 2019

(51) Int. Cl.
*H04W 52/02* (2009.01)
*H04W 52/00* (2009.01)
(Continued)

(52) U.S. Cl.
CPC ...... *H04W 52/0235* (2013.01); *H04B 17/318* (2015.01); *H04W 52/00* (2013.01);
(Continued)

(58) Field of Classification Search
None
See application file for complete search history.

(56) References Cited

U.S. PATENT DOCUMENTS 9,553,640 B1 * 1/2017 Chandra ............. H04B 7/0426
2009/0052426 A1   2/2009 Perraud
(Continued)

FOREIGN PATENT DOCUMENTS

| CN | 101888263 A | 11/2010 |
| CN | 102118518 A | 7/2011 |

(Continued)

OTHER PUBLICATIONS

Extended European Search Report issued in European Application No. 15911919.7 dated Nov. 6, 2018, 7 pages.
(Continued)

*Primary Examiner* — Jay L Vogel
(74) *Attorney, Agent, or Firm* — Fish & Richardson P.C.

(57) ABSTRACT

The present invention discloses a communications device and a method and an apparatus for reducing power consumption of a communications device. The method includes: determining a minimum supply voltage that is for a WiFi power amplification circuit at an actual transmit power and that meets a WiFi communication rate; and providing a working voltage to the WiFi power amplification circuit to transmit data, where the working voltage is a voltage that is not lower than the minimum supply voltage and that is lower than a maximum supply voltage. According to the foregoing disclosed content, in the present invention, a supply voltage for a WiFi power amplifier in a communications device can be dynamically adjusted according to a transmit power required by the communications device to send data, so as to reduce power consumption of a communications system.

17 Claims, 5 Drawing Sheets

(51) Int. Cl.
*H04W 52/14* (2009.01)
*H04W 52/24* (2009.01)
*H04W 52/26* (2009.01)
*H04B 17/318* (2015.01)
*H04W 52/36* (2009.01)
*H04W 84/12* (2009.01)
*H04W 52/52* (2009.01)

(52) U.S. Cl.
CPC ....... *H04W 52/146* (2013.01); *H04W 52/245* (2013.01); *H04W 52/267* (2013.01); *H04W 52/0245* (2013.01); *H04W 52/367* (2013.01); *H04W 84/12* (2013.01); *Y02D 30/70* (2020.08)

(56) References Cited

U.S. PATENT DOCUMENTS

| | | | | |
|---|---|---|---|---|
| 2010/0041428 | A1* | 2/2010 | Chen | H04W 52/16 455/522 |
| 2010/0291975 | A1* | 11/2010 | Dimpflmaier | H03F 1/0211 455/572 |
| 2011/0095828 | A1 | 4/2011 | Zhang et al. | |
| 2011/0111748 | A1 | 5/2011 | Choi | |
| 2013/0039212 | A1* | 2/2013 | Li | H04W 52/0245 370/253 |
| 2014/0269469 | A1* | 9/2014 | Tran | H04W 52/0251 370/311 |
| 2016/0197627 | A1 | 7/2016 | Qin et al. | |
| 2016/0309480 | A1* | 10/2016 | Verma | H04W 52/267 |
| 2016/0337976 | A1 | 11/2016 | Wang et al. | |
| 2016/0337985 | A1* | 11/2016 | Amizur | H04W 52/367 |

FOREIGN PATENT DOCUMENTS

| | | |
|---|---|---|
| CN | 102714847 A | 10/2012 |
| CN | 203313416 U | 11/2013 |
| CN | 104539246 A | 4/2015 |
| CN | 104780593 A | 7/2015 |
| EP | 2251975 A1 | 11/2010 |
| EP | 2388911 A2 | 11/2011 |
| JP | 2009529842 A | 8/2009 |
| JP | 2011527131 A | 10/2011 |
| JP | 2015177409 A | 10/2015 |
| KR | 20100122869 A | 11/2010 |
| WO | 2015103936 A1 | 7/2015 |

OTHER PUBLICATIONS

International Search Report and Written Opinion issued in International Application No. PCT/CN2015/100118 dated Oct. 8, 2016, 9 pages.
Office Action issued in Korean Application No. 10-2018-7021342, dated May 27, 2019, 11 pages (With English translation).
Office Action issued in Chinese Application No. 201580084954.8 dated Nov. 8, 2019, 6 pages.
Office Action issued in Japanese Application No. 2018-534700 dated Sep. 3, 2019, 13 pages (with English translation).

* cited by examiner

Determine a minimum supply voltage that is for a WiFi power amplification circuit at an actual transmit power and that meets a WiFi communication rate

S11

Provide a working voltage to the WiFi power amplification circuit to transmit data, where the working voltage is a voltage that is not lower than the minimum supply voltage and that is lower than a maximum supply voltage

COMMUNICATIONS DEVICE AND METHOD AND APPARATUS FOR REDUCING POWER CONSUMPTION OF COMMUNICATIONS DEVICE

CROSS-REFERENCE TO RELATED APPLICATIONS

This application is a National Stage of International Application No. PCT/CN2015/100118, filed on Dec. 31, 2015, which is hereby incorporated by reference in its entirety.

TECHNICAL FIELD

The present invention relates to the communications field, and in particular, to a communications device and a method and an apparatus for reducing power consumption of a communications device.

BACKGROUND

With increasing popularity and rapid growth of communications devices, ever-increasing terminal users use the communications devices. A user prefers to use WiFi in more application scenarios to perform data service communication, and WiFi usage scenarios become more frequent. Currently, a communications device that accesses a WiFi access point (Access Point, AP) provides a fixed supply voltage to a WiFi power amplifier, and supplies power to the WiFi power amplifier at a maximum supply voltage. Therefore, power consumption is high, and endurance of a portable product is affected.

SUMMARY

In view of this, embodiments of the present invention provide a communications device and a method and an apparatus for reducing power consumption of a communications device, so as to dynamically adjust a supply voltage for a WiFi power amplifier in a communications device according to an actual transmit power required by the communications device to transmit data, and reduce power consumption of the communications device.

A first aspect provides a method for reducing power consumption of a communications device, including: determining a minimum supply voltage that is for a WiFi power amplification circuit at an actual transmit power and that meets a WiFi communication rate; and providing a working voltage to the WiFi power amplification circuit to transmit data, where the working voltage is a voltage that is not lower than the minimum supply voltage and that is lower than a maximum supply voltage.

With reference to the implementation of the first aspect, in a first possible implementation, the determining a minimum supply voltage that is for a WiFi power amplification circuit at an actual transmit power and that meets a WiFi communication rate includes: searching a voltage mapping table for the minimum supply voltage corresponding to the WiFi communication rate and the actual transmit power, where the voltage mapping table records a one-to-one mapping relationship among the WiFi communication rate, a maximum transmit power, and the minimum supply voltage, each WiFi communication rate is corresponding to at least two different maximum transmit powers, the at least two different maximum transmit powers are separately corresponding to different minimum supply voltages, the maximum transmit power is a maximum transmit power that is defined by a WiFi communications protocol and that can be implemented at the minimum supply voltage and the WiFi communication rate, and searching for the corresponding actual transmit power in the voltage mapping table is searching for the maximum transmit power same as the actual transmit power.

With reference to the first possible implementation of the first aspect, in a second possible implementation, after the providing a working voltage to the WiFi power amplification circuit to transmit data, the method further includes: determining whether the data is successfully transmitted, and if transmission fails, retransmitting the data by using the maximum supply voltage as an actual working voltage of the WiFi power amplification circuit.

With reference to the implementation of the first aspect, in a third possible implementation, the step of determining a minimum supply voltage that is for a WiFi power amplification circuit at an actual transmit power and that meets a WiFi communication rate is performed when a preset condition is met, and the preset condition is as follows: the communications device detects a data transmission request.

With reference to the first aspect, and the first possible, the second possible, and the third possible implementations of the first aspect, in a fourth possible implementation, before the determining a minimum supply voltage that is for a WiFi power amplification circuit at an actual transmit power and that meets a WiFi communication rate, the method includes: detecting received signal strength from a WiFi access point, and detecting the WiFi communication rate used by the communications device to transmit data to the WiFi access point; and determining the actual transmit power according to the received signal strength and the WiFi communication rate, where stronger received signal strength indicates a smaller actual transmit power, and a higher WiFi communication rate indicates a smaller actual transmit power.

With reference to the fourth possible implementation of the first aspect, in a fifth possible implementation, the determining the actual transmit power according to the received signal strength and the WiFi communication rate includes: finding a preset transmit power corresponding to the received signal strength and the WiFi communication rate from a power mapping table, and determining the preset transmit power as the actual transmit power, where in the power mapping table, each WiFi communication rate under the same received signal strength is corresponding to one preset transmit power.

A second aspect provides an apparatus for reducing power consumption of a communications device, where the apparatus includes: a voltage determining module, configured to determine a minimum supply voltage that is for a WiFi power amplification circuit at an actual transmit power and that meets a WiFi communication rate; and a power supply module, connected to the voltage determining module, and configured to provide a working voltage to the WiFi power amplification circuit to transmit data, where the working voltage is a voltage that is not lower than the minimum supply voltage and that is lower than a maximum supply voltage.

With reference to the implementation of the second aspect, in a first possible implementation, the apparatus further includes a storage module, the storage module is configured to store a voltage mapping table, and the voltage determining module is configured to: search the voltage mapping table for the minimum supply voltage corresponding to the WiFi communication rate and the actual transmit power, where the voltage mapping table records a one-toone mapping relationship among the WiFi communication rate, a maximum transmit power, and the minimum supply voltage, each WiFi communication rate is corresponding to at least two different maximum transmit powers, the at least two different maximum transmit powers are separately corresponding to different minimum supply voltages, the maximum transmit power is a maximum transmit power that is defined by a WiFi communications protocol and that can be implemented at the minimum supply voltage and the WiFi communication rate, and searching for the corresponding actual transmit power in the voltage mapping table is searching for the maximum transmit power same as the actual transmit power.

With reference to the first possible implementation of the second aspect, in a second possible implementation, the apparatus further includes a determining module, and the determining module is configured to: determine whether the data is successfully transmitted, and if transmission fails, the power supply module retransmits the data by using the maximum supply voltage as an actual working voltage of the WiFi power amplification circuit.

With reference to the second possible implementation of the second aspect, in a third possible implementation, the apparatus further includes a detection module, the step in which the voltage determining module determines the minimum supply voltage that is for the WiFi power amplification circuit at the actual transmit power and that meets the WiFi communication rate is performed when a preset condition is met, and the preset condition is as follows: the detection module detects a data transmission request.

With reference to the second aspect, and the first possible, the second possible, and the third possible implementations of the second aspect, in a fourth possible implementation, the apparatus further includes a power determining module, and the power determining module is configured to: detect received signal strength from a WiFi access point, and detect the WiFi communication rate used by the communications device to transmit data to the WiFi access point; and determine the actual transmit power according to the received signal strength and the WiFi communication rate, where stronger received signal strength indicates a smaller actual transmit power, and a higher WiFi communication rate indicates a smaller actual transmit power.

With reference to the fourth possible implementation of the second aspect, in a fifth possible implementation, the power determining module is configured to: find a preset transmit power corresponding to the received signal strength and the WiFi communication rate from a power mapping table, and determine the preset transmit power as the actual transmit power of the WiFi power amplification circuit, where in the power mapping table, each data transmission rate under the same received signal strength is corresponding to one preset transmit power.

A third aspect provides a communications device, where the communications device includes a WiFi circuit, the WiFi circuit includes a WiFi power amplification circuit, a voltage source, and a WiFi chip, the WiFi chip is separately connected to the WiFi power amplification circuit and the voltage source, and the voltage source is connected to the WiFi power amplification circuit; and the WiFi chip determines a minimum supply voltage that is for the WiFi power amplification circuit at an actual transmit power and that meets a WiFi communication rate, and controls the voltage source to provide a working voltage to the WiFi power amplification circuit to transmit data, where the working voltage is a voltage that is not lower than the minimum supply voltage and that is lower than a maximum supply voltage.

With reference to the implementation of the third aspect, in a first possible implementation, the WiFi chip is configured to: search a voltage mapping table for the minimum supply voltage corresponding to the WiFi communication rate and the actual transmit power, where the voltage mapping table records a one-to-one mapping relationship among the WiFi communication rate, a maximum transmit power, and the minimum supply voltage, each WiFi communication rate is corresponding to at least two different maximum transmit powers, the at least two different maximum transmit powers are separately corresponding to different minimum supply voltages, the maximum transmit power is a maximum transmit power that is defined by a WiFi communications protocol and that can be implemented at the minimum supply voltage and the WiFi communication rate, and searching for the corresponding actual transmit power in the voltage mapping table is searching for the maximum transmit power same as the actual transmit power.

With reference to the third aspect and the first possible implementation of the third aspect, in a second possible implementation, the WiFi chip further detects received signal strength from a WiFi access point, and detects the WiFi communication rate used by the communications device to transmit data to the WiFi access point; and determines the actual transmit power according to the received signal strength and the WiFi communication rate, where stronger received signal strength indicates a smaller actual transmit power, and a higher WiFi communication rate indicates a smaller actual transmit power.

With reference to the second possible implementation of the third aspect, in a third possible implementation, the WiFi chip further finds a preset transmit power corresponding to the received signal strength and the WiFi communication rate from a power mapping table, and determines the preset transmit power as the actual transmit power of the WiFi power amplification circuit, where in the power mapping table, each data transmission rate under the same received signal strength is corresponding to one preset transmit power.

In the present invention, the minimum supply voltage that is for the WiFi power amplification circuit at the actual transmit power and that meets the WiFi communication rate is determined; and the working voltage is provided to the WiFi power amplification circuit to transmit data, where the working voltage is a voltage that is not lower than the minimum supply voltage and that is lower than the maximum supply voltage. The working voltage of the WiFi power amplification circuit in the communications device can be dynamically adjusted according to the transmit power required by the communications device WiFi to transmit the data, and the maximum supply voltage does not need to be always provided to the WiFi power amplification circuit. Therefore, power consumption of the communications device can be reduced.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
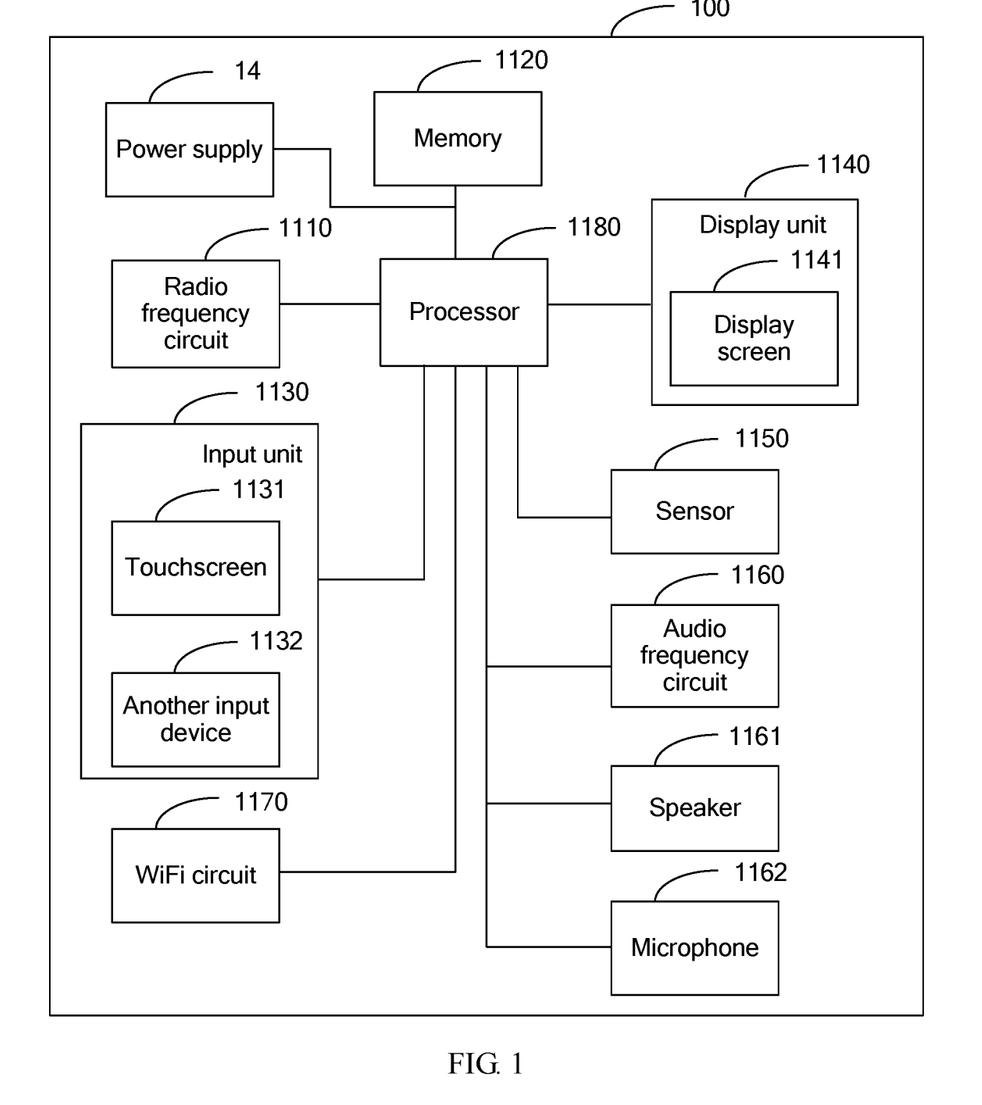
FIG. 1 is a schematic structural diagram of a communications device according to an embodiment of the present invention.

FIG. 1 is a schematic structural diagram of a communications device according to an embodiment of the present invention. A communications device 100 includes components such as a radio frequency (Radio Frequency, RF) circuit 1110, a memory 1120, an input unit 1130, a display unit 1140, a sensor 1150, an audio frequency circuit 1160, a Wireless Fidelity (wireless fidelity, WiFi) circuit 1170, a processor 1180, and a power supply 1190. These components communicate by using one or more communications buses or signal cables. The communications device 100 may be any communications device, includes but is not limited to a handheld computer, a tablet computer, a mobile phone, a media player, a personal digital assistant (PDA), or the like, and further includes a combination of two or more of the items. A person skilled in the art may understand that the device structure shown in FIG. 1 does not constitute a limitation on the communications device, components more or fewer than those shown in FIG. 1 may be included, some components may be combined, or the components may be arranged in a different way.

The following specifically describes each constituent component of the communications device 100 with reference to FIG. 1.

The RF circuit 1110 may be configured to: receive and send information, or receive and send a signal in a call process; in particular, receive downlink information from a base station and send the downlink information to the processor 1180 for processing; and in addition, send uplink data to the base station. Generally, the RF circuit includes but is not limited to an antenna, at least one amplifier, a transceiver, a coupler, a low noise amplifier (Low Noise Amplifier, LNA), a duplexer, and the like. In addition, the RF circuit 1110 may further communicate with a network or another device by means of wireless communication. The foregoing wireless communication may use any communications standard or protocol, including but not limited to a Global System for Mobile Communications (Global System of Mobile communication, GSM), a general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), email, a short messaging service (Short Messaging Service, SMS), or the like.

The memory 1120 may be configured to store a software program and a module. By running the software program and the module stored in the memory 1120, the processor 1180 executes various functions or applications on the communications device and processes data. The memory 1120 may mainly include a program storage area and a data storage area; the program storage area may store an operating system, an application program (such as a sound playing function or an image playing function) required by at least one function, or the like; and the data storage area may store data (such as audio data or a phone book) created according to usage of the communications device, or the like. In addition, the memory 1120 may include a high-speed random access memory, and may further include a nonvolatile memory, such as at least one magnetic disk storage component, a flash memory component, or another volatile solid-state storage component.

The input unit 1130 may be configured to receive input gesture information or digital or character information, and generate key signal input related to user setting and function control of the communications device 100. Specifically, the input unit 1130 may include a touchscreen 1131 and another input device 1132. The touchscreen 1131 may collect a touch operation (such as an operation performed by a user on the touchscreen 1131 or near the touchscreen 1131 by using any proper object or accessory, such as a finger or a stylus) of a user on or near the touchscreen 1131, and drive a corresponding connected apparatus according to a preset program. Specifically, the touch operation may include one or more of the following operating manners: a pressure operation, a touch operation (such as a sliding operation or a drag operation), a tapping operation, a multi-touch operation, button input, touch-hold input, and the like. Optionally, the touchscreen 1131 may include a touch sensor (Touch Sensor) and/or a pressure sensor (Force Sensor), and is configured to: detect a touch signal and/or a pressure signal of the user, convert the touch signal into touch point coordinates, a gesture track, and other touch information, convert the pressure signal into a pressure value and other information, send the foregoing information to the processor 1180, and receive and execute a command sent by the processor 1180. In addition, the touchscreen 1131 may be implemented by using multiple types such as a resistive type, a capacitive type, an infrared ray, and a surface acoustic wave. The input unit 1130 may include the another input device 1132 in addition to the touchscreen 1131. Specifically, the another input device 1132 may include but is not limited to one or more of a physical keyboard, a function key (such as a volume control key or an on/off key), a trackball, a mouse, a joystick, or the like.

The display unit 1140 may be configured to display information input by the user or information provided to the user and various menus of the communications device. The display unit 1140 may include a display screen 1141. Optionally, a form such as a liquid crystal display (Liquid Crystal Display, LCD) or an organic light-emitting diode (Organic Light-Emitting Diode, OLED) may be used to configure the display screen 1141. Further, the touchscreen 1131 may cover the display screen 1141. After detecting a touch operation on or near the touchscreen 1131, the touchscreen 1131 sends the touch operation to the processor 1180 to determine a type of a touch event, and then the processor 1180 provides corresponding visual output on the display screen 1141 according to the type of the touch event. In FIG. 1, the touchscreen 1131 and the display screen 1141 are used as two independent components to implement input and output functions of the communications device. However, in some embodiments, the touchscreen 1131 and the display screen 1141 may be integrated to implement the input and output functions of the communications device.

The communications device may further include at least one sensor 1150, such as a pressure sensor, a light sensor, a motion sensor, or another sensor. In addition to being located in the touchscreen, the pressure sensor may be located at a side frame of the communications device. When the side frame is squeezed, the pressure sensor may detect a pressure value of squeezing. The light sensor may include an ambient light sensor and a proximity sensor. The ambient light sensor may adjust luminance of the display screen 1141 according to brightness of ambient light, and the light sensor may turn off the display screen 1141 and/or backlight when the communications device approaches an ear. As one motion sensor, an acceleration sensor may detect an acceleration value in each direction (generally, three axes), and may detect a value and a direction of gravity when the acceleration sensor is static, and may be used in an application for recognizing a posture (such as screen switching between landscape and portrait modes, a related game, or magnetometer posture calibration) of the communications device, a function related to vibration recognition (such as a pedometer or a knock), or the like. For another sensor such as a gyroscope, a barometer, a hygrometer, a thermometer, or an infrared sensor that may be further disposed on the communications device, details are not described herein. Although FIG. 1 shows the sensor 1150, it may be understood that the sensor is not a mandatory part of the communications device, and may be omitted according to a need without changing the essence of the present invention.

The audio frequency circuit 1160, a speaker 1161, and a microphone 1162 may provide an audio interface between the user and the communications device. The audio frequency circuit 1160 may convert received audio data into an electrical signal, and transmit the electrical signal to the speaker 1161, and the speaker 1161 converts the electrical signal into a voice signal for output. In addition, the microphone 1162 converts a collected voice signal into an electrical signal, and the audio frequency circuit 1160 receives the electrical signal, converts the electrical signal into audio data, and outputs the audio data to the processor 1180 for processing, so as to send the audio data to, for example, another communications device by using the RF circuit 1110, or output the audio data to the memory 1120 for further processing.

The WiFi circuit 1170 belongs to a short-distance wireless transmission technology. The communications device may help, by using the WiFi circuit 1170, the user receive and send an email, browse a web page, access streaming media, or the like. The WiFi circuit 1170 provides the user with wireless broadband Internet access.

The processor 1180 is a control center of the communications device, is connected to all parts of the entire communications device by using various interfaces and lines, and executes various functions of the communications device and processes data by running or executing the software program and/or the module stored in the memory 1120 and by invoking data stored in the memory 1120, so as to perform overall monitoring on the communications device. Optionally, the processor 1180 may include one or more processing units. Preferably, an application processor and a modem processor may be integrated into the processor 1180. The application processor mainly processes an operating system, a user interface, an application program, and the like, and the modem processor mainly processes wireless communication. It may be understood that the modem processor may be not integrated into the processor 1180.

The communications device further includes the power supply 1190 (such as a battery) that supplies power to all the parts. Preferably, the power supply may be logically connected to the processor 1180 by using a power management system, so as to implement functions such as charging and discharging management and power consumption management by using the power management system.

The communications device may further include a camera, a Bluetooth module, a GPS module, and the like, which are not shown though and are not described in detail herein.

Figure 2:
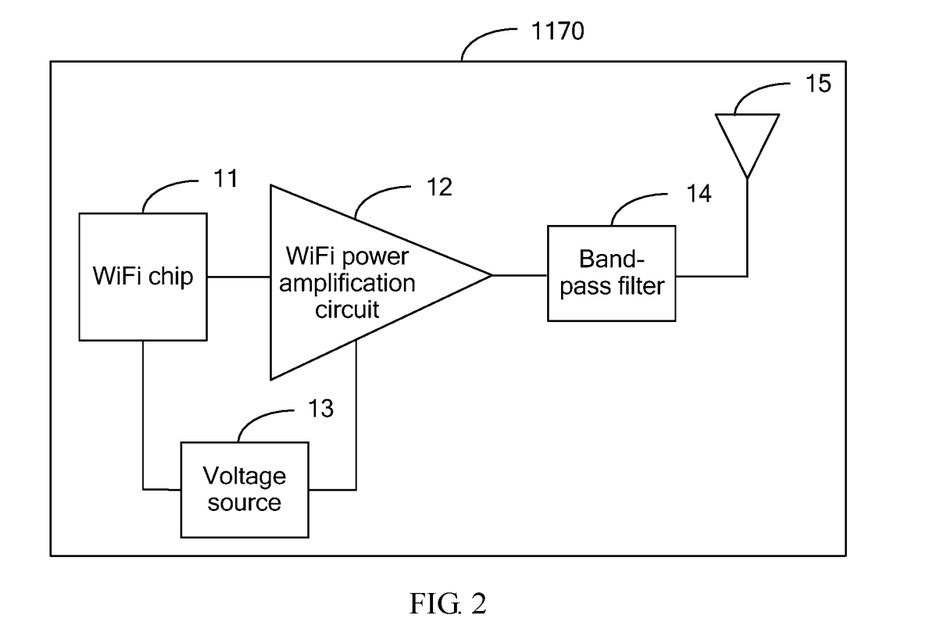
FIG. 2 is a schematic structural diagram of a WiFi circuit according to a first embodiment in FIG. 1.

FIG. 2 is a schematic structural diagram of the WiFi circuit in FIG. 1 according to an embodiment of the present invention. As shown in FIG. 2, the WiFi circuit 1170 includes a WiFi chip 11, a WiFi power amplification circuit 12, a voltage source 13, a band-pass filter 14, and an antenna 15. The WiFi chip 11 is connected to the WiFi power amplification circuit 12 and the voltage source 13, the voltage source 13 is further connected to the WiFi power amplification circuit 12, and the band-pass filter 14 is connected between the WiFi power amplification circuit 12 and the antenna 15. During uplink data transmission, the WiFi chip 11 transmits data to the WiFi power amplification circuit 12, and the WiFi chip 11 controls the voltage source 13 to provide a working voltage to the WiFi power amplification circuit 12, so that the WiFi power amplification circuit 12 performs amplification processing at the working voltage. Then, the data is filtered by the band-pass filter 14 and is sent by the antenna 15. During downlink data transmission, data received by the antenna 15 is filtered by the band-pass filter 14 and is transmitted to the WiFi power amplification circuit 12, the WiFi chip 11 controls the voltage source 13 to provide a working voltage to the WiFi power amplifier 12, and the WiFi power amplification circuit 12 performs amplification processing at the working voltage and transmits the data to the WiFi chip 11.

In this embodiment of the present invention, the WiFi chip 11 is configured to: determine a minimum supply voltage that is for the WiFi power amplification circuit at an actual transmit power and that meets a WiFi communication rate 12; and provide a working voltage to the WiFi power amplification circuit 12 to transmit data, where the working voltage is a voltage that is not lower than the minimum supply voltage and that is lower than a maximum supply voltage. The WiFi chip 11 controls the voltage source 13 to provide the working voltage to the WiFi power amplification circuit 12 to transmit the data. The WiFi communication rate is a physical layer rate of the communications device.

In this embodiment of the present invention, a user enables a WiFi communications function of the communications device. The WiFi chip 11 detects whether there is a data transmission request, and if there is a data transmission request, determines the actual transmit power of the WiFi power amplification circuit 12 according to a channel status. The channel status includes the WiFi communication rate, received signal strength, a packet error rate, and the like of the communications device 10. For example, when the communications device is relatively close to a WiFi access point, WiFi signal quality is relatively good, and a transmit power of the WiFi power amplification circuit 12 can be decreased, that is, the working voltage of the WiFi power amplification circuit 12 can be decreased.

That the WiFi chip 11 determines the actual transmit power of the WiFi power amplification circuit 12 according to the channel status includes: detecting the received signal strength from the WiFi access point, detecting the WiFi communication rate used by the communications device to transmit data to the WiFi access point, and determining the actual transmit power according to the received signal strength and the WiFi communication rate. Both the received signal strength and the WiFi communication rate have a trending negative correlation with the actual transmit power, that is, stronger received signal strength indicates a smaller actual transmit power, and a higher WiFi communication rate indicates a smaller actual transmit power. That is, when another condition, such as the received signal strength, does not change, a higher WiFi communication rate indicates a smaller actual transmit power. When another condition, such as the WiFi communication rate, does not change, stronger received signal strength indicates a smaller actual transmit power. Although it is described above that both the received signal strength and the WiFi communication rate have a trending negative correlation with the actual transmit power, a specific negative correlation is not limited in the present invention. For example, when the received signal strength and the like do not change, there are three successively increasing WiFi communication rates: A, B, and C, that is, A<B<C, and their corresponding actual transmit powers are respectively a, b, and c, a relationship among a, b, and c may be a>b>c, or may be a=b>c.

Specifically, the WiFi chip 11 finds a preset transmit power corresponding to the received signal strength and the WiFi communication rate from a power mapping table, and determines the preset transmit power as the actual transmit power of the WiFi power amplification circuit, where in the power mapping table, each data transmission rate under the same received signal strength is corresponding to one preset transmit power. A packet error rate generated when the communications device transmits data to the WiFi access point at the actual transmit power is lower than a preset upper limit threshold.

In this embodiment of the present invention, when determining the minimum supply voltage that is for the WiFi power amplification circuit at the actual transmit power and that meets the WiFi communication rate 12, the WiFi chip 11 searches a voltage mapping table for the minimum supply voltage corresponding to the WiFi communication rate and the actual transmit power. The voltage mapping table records a one-to-one mapping relationship among the WiFi communication rate, a maximum transmit power, and the minimum supply voltage. Each WiFi communication rate is corresponding to at least two different maximum transmit powers, the at least two different maximum transmit powers are separately corresponding to different minimum supply voltages, and searching for the corresponding actual transmit power in the voltage mapping table is searching for the maximum transmit power same as the actual transmit power.

The maximum transmit power is a maximum transmit power that is defined by a WiFi communications protocol and that can be implemented at the minimum supply voltage and the WiFi communication rate. Referring to Table 1, when the WiFi communications protocol is fixed, the WiFi communication rate, a modulation scheme, a coding rate, and an error vector magnitude (Error Vector Magnitude, EVM) are fixed, and the maximum transmit power can be determined according to an error vector magnitude (Error Vector Magnitude, EVM) indicator requirement or on the premise that some margins of the EVM are reserved.

TABLE 1

Maximum transmit powers at different WiFi communication rates

| Sequence number (i) | WiFi communication rate (MCS) | Modulation (Modulation) | Coding rate (Coding Rate) | EVM (dB) | Maximum transmit power (Power) |
|---|---|---|---|---|---|
| 0 | 0 | BPSK | 1/2 | −5 | P0 |
| 1 | 1 | QPSK | 1/2 | −10 | P1 |
| 2 | 2 | QPSK | 3/4 | −13 | P2 |
| 3 | 3 | 16-QAM | 1/2 | −16 | P3 |
| 4 | 4 | 16-QAM | 3/4 | −19 | P4 |
| 5 | 5 | 64-QAM | 2/3 | −22 | P5 |
| 6 | 6 | 64-QAM | 3/4 | −25 | P6 |
| 7 | 7 | 64-QAM | 5/6 | −28 | P7 |
| 8 | 8 | 256-QAM | 3/4 | −30 | P8 |
| 9 | 9 | 256-QAM | 5/6 | −32 | P9 |

In Table 1, BPSK represents binary phase shift keying modulation, and QPSK represents quadrature phase shift keying modulation. QAM represents quadrature amplitude modulation, and 16, 64, and 256 represent modulation orders. To improve spectrum utilization and the physical layer rate, higher order modulation schemes such as 64QAM and 256QAM are introduced in the Institute of Electrical and Electronics Engineers (Institute of Electrical and Electronics Engineers, IEEE) standard. The WiFi communication rate of the communications device is shown in Table 1. It may be seen that according to the IEEE 802.11ac protocol, a higher modulation order imposes a higher EVM indicator requirement. When efficiency of the WiFi power amplification circuit 12 is fixed, a maximum transmit power that meets a corresponding WiFi communication rate is lower.

It should be noted that the maximum transmit powers at different WiFi communication rates shown in Table 1 are merely examples. The maximum transmit power may vary according to a change of a protocol, a difference in a usage environment, and a difference in a device.

Refer to Table 2 for the voltage mapping table. In Table 2, the first row represents different WiFi communication rates in different WiFi protocols, and a value, such as 16, 15, or 14, in the table represents a maximum transmit power that is of the WiFi power amplification circuit 12 at a corresponding minimum supply voltage and that meets the WiFi communication rate. The first column Vi represents a minimum supply voltage that is for the WiFi power amplification circuit 12 at a maximum transmit power and that meets a corresponding WiFi communication rate. VCC_max represents the maximum supply voltage, Delta represents a voltage difference between two adjacent supply voltages, and a value of the voltage difference may be freely set. 11b, g, n, and ac represent different WiFi protocols, and 1 M, 6 M, ..., MCS8, and MCS9 represent physical layer rates.

TABLE 2

Mapping table among WiFi communication rate, maximum transmit power, and minimum supply voltage

| Vi | 11b/ 1 M | ... | 11g/ 6 M | ... | 11g/ 54 M | 11n/ MCS0 | ... | 11n/ MCS7 | 11ac/ MCS8 | 11ac/ MCS9 |
|---|---|---|---|---|---|---|---|---|---|---|
| VCC_max | 16 | ... | 16 | ... | 15 | 15 | ... | 14 | 13 | 13 |
| VCC_max − Delta | 15 | ... | 15 | ... | 14 | 14 | ... | 13 | 12 | 12 |
| VCC_max − 2 * Delta | 14 | ... | 14 | ... | 13 | 13 | ... | 12 | 11 | 11 |
| — | ... | ... | ... | ... | ... | ... | ... | ... | ... | ... |
| VCC_max − n * Delta | 12 | ... | 12 | ... | 11 | 11 | ... | 10 | 9 | 9 |
| VCC_min | 10 | ... | 10 | ... | 9 | 9 | ... | 8 | 7 | 7 |

In Table 2, at a specific WiFi communication rate, a minimum supply voltage corresponding to a maximum transmit power is a minimum supply voltage that can be used by the WiFi power amplification circuit 12 to transmit the maximum transmit power. A supply voltage that is provided to the WiFi power amplification circuit 12 and is not lower than the minimum supply voltage in the voltage mapping table can meet a requirement that the WiFi power amplification circuit 12 can transmit the maximum transmit power. For example, under the 11b/1 M WiFi communication rate condition, when the maximum transmit power is 14 dBm, the minimum supply voltage for the WiFi power amplification circuit 12 is VCC_max−2×Delta, and when being used as working voltages of the WiFi power amplification circuit 12, voltages VCC_max−Delta and VCC_max that are higher than or equal to the minimum supply voltage can meet a requirement that a transmit power transmitted by the WiFi power amplification circuit 12 is 14 dBm. The maximum supply voltage is VCC_max.

It should be noted that the mapping relationship among the WiFi communication rate, the maximum transmit power, and the minimum supply voltage shown in Table 2 is merely an example and may vary according to a change of a protocol, a difference in a usage environment, and a difference in a device.

In this embodiment of the present invention, after providing the working voltage to the WiFi power amplification circuit 12 to transmit the data, the WiFi chip 11 determines whether the data is successfully transmitted, and if transmission fails, controls the voltage source 13 to provide the maximum supply voltage to the WiFi power amplification circuit so as to retransmit the data by using the maximum supply voltage as an actual working voltage of the WiFi power amplification circuit 12. If transmission succeeds, the WiFi chip 11 determines whether the data is completely transmitted. If transmission is completed, current transmission of the data ends, and power supplying to the WiFi power amplification circuit 12 stops. If transmission is not completed, the minimum supply voltage that is for the WiFi power amplification circuit at the actual transmit power and that meets the WiFi communication rate 12 is re-determined so as to continue transmitting unsent data. In this embodiment of the present invention, a parity bit may be set in the transmitted data to determine whether the data is successfully transmitted, and a flag bit may be set at the tail of the data to determine whether the data is completely transmitted. Certainly, another method may be used, and this is not limited herein.

In this embodiment of the present invention, the WiFi chip 11 determines, by searching the voltage mapping table according to the WiFi communication rate and the actual transmit power of the WiFi power amplification circuit 12, the minimum supply voltage that is for the WiFi power amplification circuit 12 and that meets the actual transmit power, and provides the supply voltage to the WiFi power amplification circuit 12 to transmit data, where the working voltage is a voltage that is not lower than the minimum supply voltage and that is lower than the maximum supply voltage. In this way, the supply voltage for the WiFi power amplification circuit 12 is dynamically adjusted according to the actual transmit power of the WiFi power amplification circuit 12, WiFi power consumption is reduced, usage duration of the communications device is prolonged, and user experience is improved.

In the foregoing embodiments, the minimum supply voltage may be selected, and power consumption is the lowest in this case, or any supply voltage that is higher than the minimum supply voltage but lower than the maximum supply voltage may be selected. Certainly, if the foregoing voltage cannot meet a communication requirement, the maximum supply voltage may be further selected.

In addition, the actual transmit power may be selected by searching the power mapping table according to the foregoing embodiment, or the preset transmit power in the device may be directly selected without considering the received signal strength.

Figure 3:
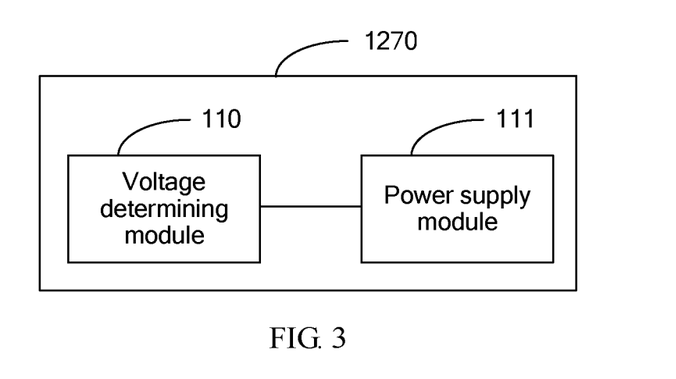
FIG. 3 is a schematic structural diagram of an apparatus for reducing power consumption of a communications device according to a first embodiment of the present invention.

FIG. 3 is a schematic structural diagram of an apparatus for reducing power consumption of a communications device according to a first embodiment in FIG. 1. An apparatus 20 includes a voltage determining module 21 and a power supply module 22. The voltage determining module 21 is configured to determine a minimum supply voltage that is for a WiFi power amplification circuit at an actual transmit power and that meets a WiFi communication rate. The power supply module 22 is connected to the voltage determining module 21, and is configured to provide a working voltage to the WiFi power amplification circuit to transmit data, where the working voltage is a voltage that is not lower than the minimum supply voltage and that is lower than a maximum supply voltage.

Preferably, the voltage determining module 21 is configured to search a voltage mapping table for the minimum supply voltage corresponding to the WiFi communication rate and the actual transmit power. Specifically, refer to the foregoing Table 2 for the voltage mapping table. The voltage mapping table records a one-to-one mapping relationship among the WiFi communication rate, a maximum transmit power, and the minimum supply voltage, each WiFi communication rate is corresponding to at least two different maximum transmit powers, the at least two different maximum transmit powers are separately corresponding to different minimum supply voltages, the maximum transmit power is a maximum transmit power that is defined by a WiFi communications protocol and that can be implemented at the minimum supply voltage and the WiFi communication rate, and searching for the corresponding actual transmit power in the voltage mapping table is searching for the maximum transmit power same as the actual transmit power.

Figure 4:
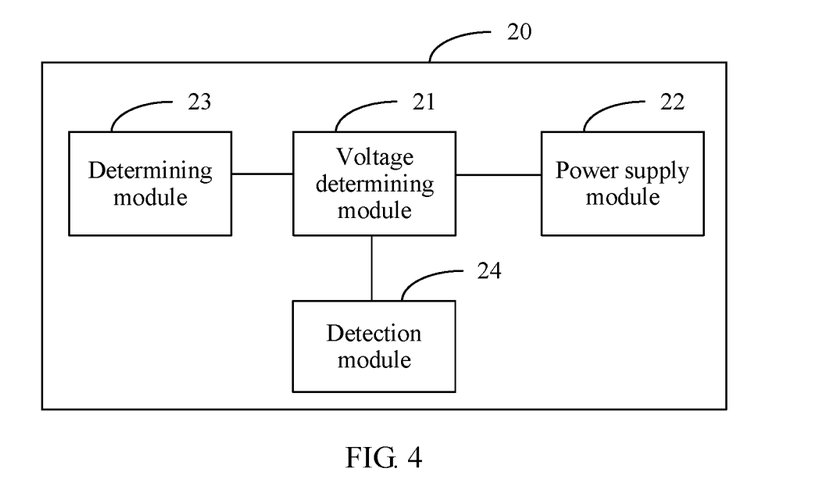
FIG. 4 is a schematic structural diagram of an apparatus for reducing power consumption of a communications device according to a second embodiment of the present invention.

Referring to FIG. 4, the apparatus 20 further includes a determining module 23 and a detection module 24. The step in which the voltage determining module 21 determines the minimum supply voltage that is for the WiFi power amplifier at the actual transmit power and that meets the WiFi communication rate is performed when a preset condition is met, and the preset condition is as follows: The detection module 24 detects a data transmission request. If the detection module 24 detects that the communications device has no data transmission request, the power supply module 22 stops supplying power to the WiFi power amplification circuit.

Figure 5:
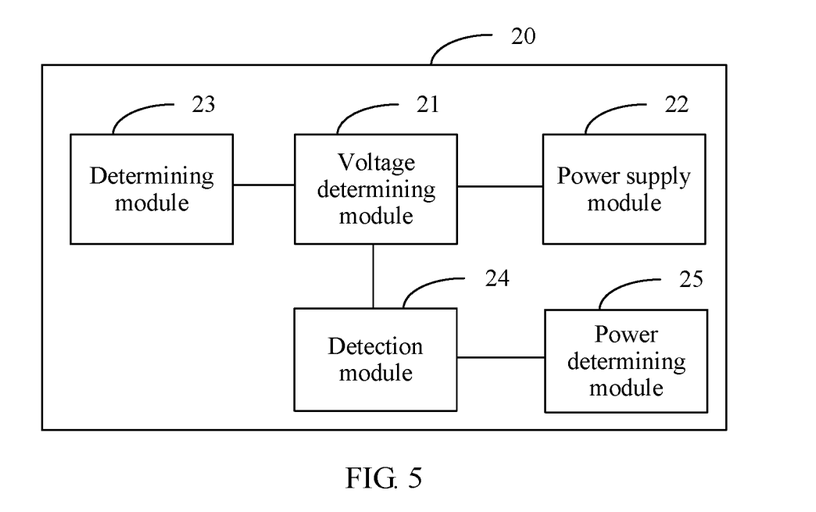
FIG. 5 is a schematic structural diagram of an apparatus for reducing power consumption of a communications device according to a third embodiment of the present invention.

Referring to FIG. 5, the apparatus 20 further includes a power determining module 25. Before the voltage determining module 21 determines the minimum supply voltage that is for the WiFi power amplification circuit at the actual transmit power and that meets the WiFi communication rate, the power determining module 21 is configured to: detect received signal strength from a WiFi access point, and detect the WiFi communication rate used by the communications device to transmit data to the WiFi access point; and determine the actual transmit power according to the received signal strength and the WiFi communication rate, where stronger received signal strength indicates a smaller actual transmit power, and a higher WiFi communication rate indicates a smaller actual transmit power. Specifically, the voltage determining module 21 further finds a preset transmit power corresponding to the received signal strength and the WiFi communication rate from a power mapping table, and determines the preset transmit power as the actual transmit power of the WiFi power amplification circuit, where in the power mapping table, each data transmission rate under the same received signal strength is corresponding to one preset transmit power. A packet error rate generated when the communications device transmits data to the WiFi access point at the actual transmit power is lower than a preset upper limit threshold.

After the power supply module 22 provides the working voltage to the WiFi power amplification circuit to transmit the data, the determining module 23 is configured to determine whether the data is successfully transmitted. If transmission fails, the power supply module 22 retransmits the data by using the maximum supply voltage as an actual working voltage of the WiFi power amplification circuit. If transmission succeeds, it is determined whether the data is completely transmitted. If transmission is completed, the power supply module 22 stops supplying power to the WiFi power amplification circuit, that is, the supply voltage for the WiFi power amplification circuit is 0. If the data is not completely transmitted, the voltage determining module 21 re-determines the minimum supply voltage that is for the WiFi power amplification circuit at the actual transmit power and that meets the WiFi communication rate, so as to continue transmitting the data. In this embodiment of the present invention, a parity bit may be set in the transmitted data to determine whether the data is successfully transmitted, and a flag bit may be set at the tail of the data to determine whether the data is completely transmitted. Certainly, another method may be used, and this is not limited herein. In this way, in this embodiment of the present invention, the supply voltage for the WiFi power amplification circuit is dynamically adjusted according to the transmit power required by the WiFi power amplification circuit to transmit data, so that power consumption of the communications device can be reduced, usage time of the communications device can be prolonged, and user experience can be improved.

Figure 6:
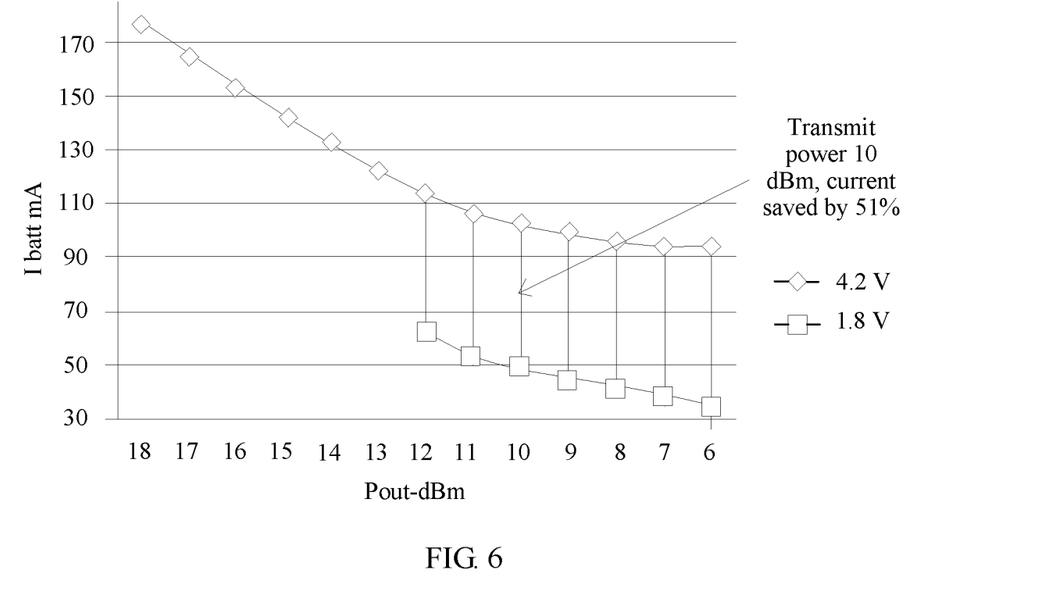
FIG. 6 is a schematic diagram of an effect of reducing power consumption of a communications device according to an embodiment of the present invention.

As shown in FIG. 6, a mobile phone is used as an example. A vertical coordinate is a current on a battery end of the communications device, and a horizontal coordinate is the actual transmit power of the WiFi power amplifier. WiFi 5G 54 M is used as an example. When the received signal strength is above −55 dBm, a transmit power 10 dBm of the mobile phone can meet a normal throughput requirement. The current on the battery end is saved by about 51%, the working voltage of the WiFi power amplification circuit is decreased from 4.2 V to 1.8 V, the transmit power is maintained at 10 dBm, and power consumption is reduced by about 51%.

The apparatus in this embodiment of the present invention may be applied to a WiFi communications system or a multi-rate communications system with orthogonal frequency division multiplexing modulation.

Figure 7:
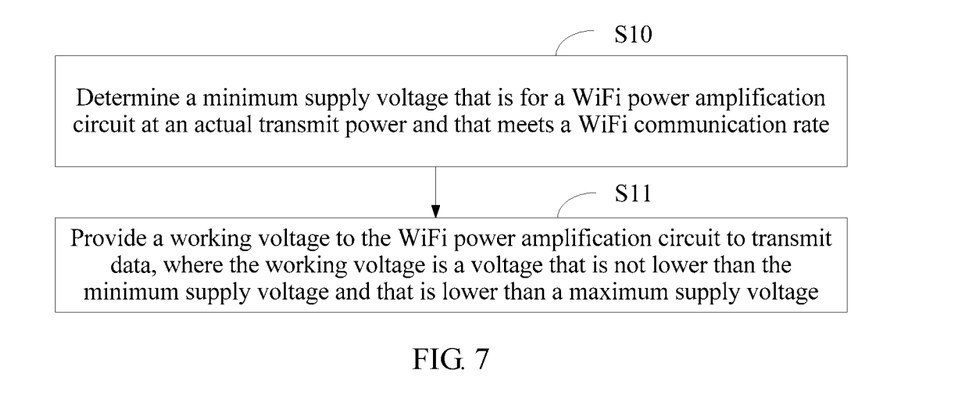
FIG. 7 is a schematic flowchart of a method for reducing power consumption of a communications device according to a first embodiment of the present invention.

FIG. 7 is a schematic flowchart of a method for reducing power consumption of a communications device according to a first embodiment of the present invention. As shown in FIG. 7, the method for reducing power consumption of a communications device in this embodiment of the present invention includes the following steps.

S10. Determine a minimum supply voltage that is for a WiFi power amplification circuit at an actual transmit power and that meets a WiFi communication rate.

S10 is performed when a preset condition is met, and the preset condition is as follows: A data transmission request is detected. If it is detected that the communications device has no data transmission request, power supplying to the WiFi power amplification circuit stops.

Before S10, the actual transmit power of the WiFi power amplification circuit is determined according to a channel status. The channel status is further related to received signal strength, a packet error rate, and the like. For example, when the communications device is relatively close to a WiFi access point, WiFi signal quality is relatively good, and a transmit power of the WiFi power amplification circuit can be decreased, that is, a supply voltage for the WiFi power amplification voltage can be decreased. Before S10, the method includes: detecting received signal strength from a WiFi access point, and detecting the WiFi communication rate used by the communications device to transmit data to the WiFi access point; and determining the actual transmit power according to the received signal strength and the WiFi communication rate, where stronger received signal strength indicates a smaller actual transmit power, and a higher WiFi communication rate indicates a smaller actual transmit power. Specifically, a preset transmit power corresponding to the received signal strength and the WiFi communication rate is found in a power mapping table, and the preset transmit power is determined as the actual transmit power of the WiFi power amplification circuit, where in the power mapping table, each data transmission rate under the same received signal strength is corresponding to one preset transmit power. A packet error rate generated when data is transmitted to the WiFi access point at the actual transmit power is less than a preset upper limit threshold.

In S10, a voltage mapping table is searched for the minimum supply voltage corresponding to the WiFi communication rate and the actual transmit power. The voltage mapping table records a one-to-one mapping relationship among the WiFi communication rate, a maximum transmit power, and the minimum supply voltage, each WiFi communication rate is corresponding to at least two different maximum transmit powers, the at least two different maximum transmit powers are separately corresponding to different minimum supply voltages, the maximum transmit power is a maximum transmit power that is defined by a WiFi communications protocol and that can be implemented at the minimum supply voltage and the WiFi communication rate, and searching for the corresponding actual transmit power in the voltage mapping table is searching for the maximum transmit power same as the actual transmit power.

S11. Provide a working voltage to the WiFi power amplification circuit to transmit data, where the working voltage is a voltage that is not lower than the minimum supply voltage and that is lower than a maximum supply voltage.

After the working voltage is provided to the WiFi power amplification circuit to transmit the data, the method further includes:

determining whether the data is successfully transmitted, and if transmission fails, retransmitting the data by using the maximum supply voltage as an actual working voltage of the WiFi power amplification circuit. If transmission succeeds, it is determined whether the data is successfully transmitted, and if transmission fails, the data is retransmitted by using the maximum supply voltage as the actual working voltage of the WiFi power amplifier. If transmission succeeds, it is determined whether the data is completely sent. If the data is completely sent, power supplying to the WiFi power amplifier stops, that is, a voltage output to the WiFi power amplifier is 0, and detecting whether there is a data transmission request continues. Specifically, refer to FIG. 8.

Figure 8:
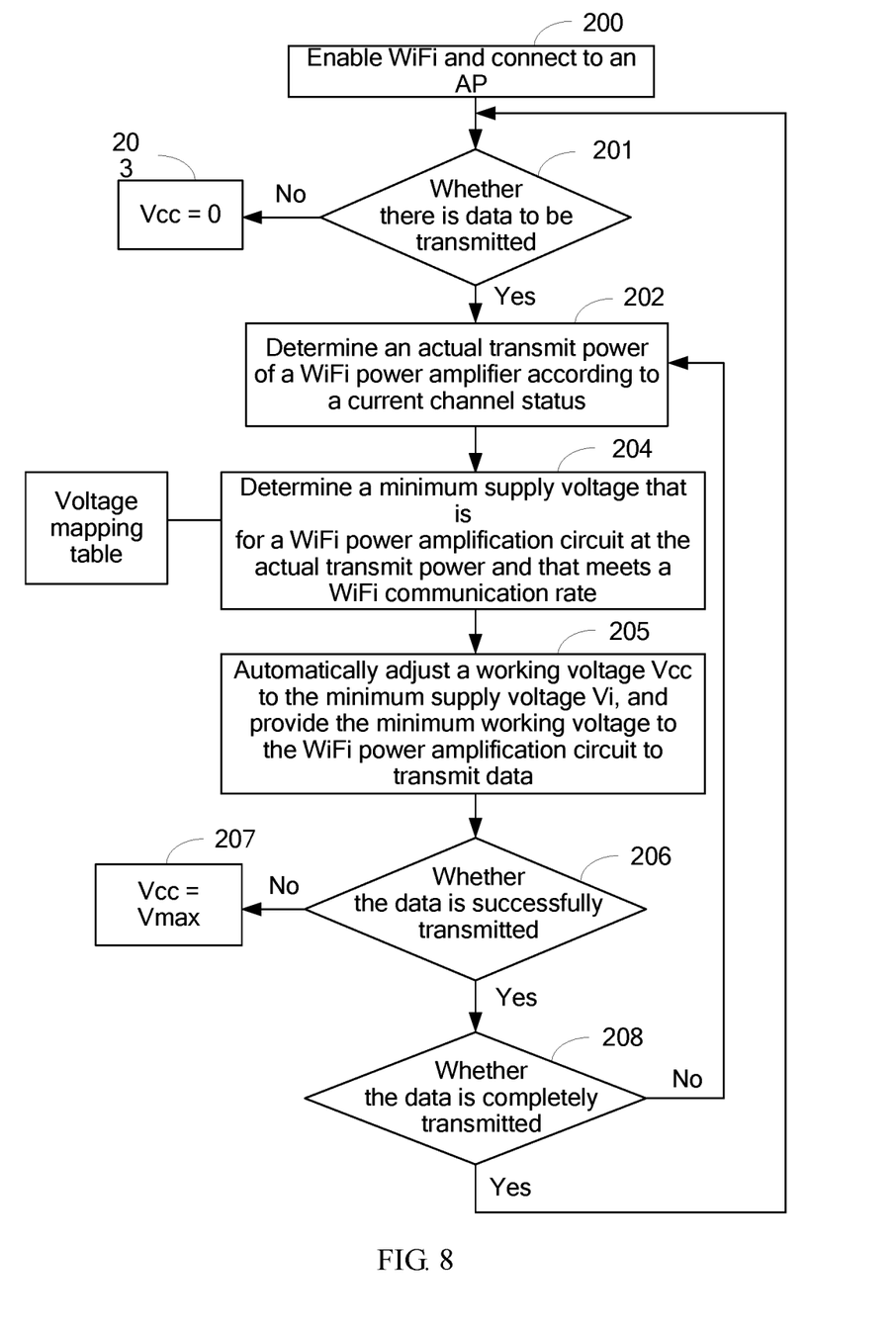
FIG. 8 is a schematic flowchart of a method for reducing power consumption of a communications device according to a second embodiment of the present invention.

S200. Enable WiFi and connect to an AP. That is, enable a WiFi function of a communications device.

S201. Determine whether there is data to be transmitted. If yes, perform S202; or if no, perform S203.

S202. Determine an actual transmit power of a WiFi power amplifier in the communications device according to a current channel status.

The channel status includes a physical layer rate of the communications device. In this embodiment of the present invention, the channel status is further related to received signal strength, a packet error rate, and the like. For example, when the communications device is relatively close to a WiFi access point, WiFi signal quality is relatively good, and a transmit power of the WiFi power amplification circuit can be decreased, that is, a supply voltage for the WiFi power amplification circuit can be decreased.

In S202, received signal strength from the WiFi access point is detected, a WiFi communication rate used by the communications device to transmit data to the WiFi access point is detected, and the actual transmit power is determined according to the received signal strength and the WiFi communication rate, where stronger received signal strength indicates a smaller actual transmit power, and a higher WiFi communication rate indicates a smaller actual transmit power. Specifically, a preset transmit power corresponding to the received signal strength and the WiFi communication rate is found in a power mapping table, and the preset transmit power is determined as the actual transmit power of the WiFi power amplification circuit, where in the power mapping table, each data transmission rate under the same received signal strength is corresponding to one preset transmit power. A packet error rate generated when data is transmitted to the WiFi access point at the actual transmit power is less than a preset upper limit threshold. Jump to S204.

S203. A supply voltage Vcc=0. When there is no data to be transmitted, it is considered by default that the supply voltage for the WiFi power amplification circuit in the communications device is 0, that is, power supplying to the WiFi power amplification circuit stops. Jump to S201.

S204. Determine a minimum supply voltage that is for the WiFi power amplification circuit at the actual transmit power and that meets a WiFi communication rate.

In S204, a voltage mapping table is searched for the minimum supply voltage corresponding to the WiFi communication rate and the actual transmit power. The voltage mapping table records a one-to-one mapping relationship among the WiFi communication rate, a maximum transmit power, and the minimum supply voltage, each WiFi communication rate is corresponding to at least two different maximum transmit powers, the at least two different maximum transmit powers are separately corresponding to different minimum supply voltages, the maximum transmit power is a maximum transmit power that is defined by a WiFi communications protocol and that can be implemented at the minimum supply voltage and the WiFi communication rate, and searching for the corresponding actual transmit power in the voltage mapping table is searching for the maximum transmit power same as the actual transmit power.

S205. Automatically adjust a working voltage Vcc to the minimum supply voltage Vi, and provide the minimum working voltage to the WiFi power amplification circuit to transmit data.

S206. Determine whether the data is successfully transmitted. If transmission succeeds, perform S208; or if transmission fails, perform S207.

S207. The working voltage Vcc=Vmax. That is, adjust the working voltage to a maximum supply voltage to retransmit the data.

In step S207, the working voltage of the WiFi power amplification circuit may be further adjusted to any supply voltage that is higher than the minimum supply voltage and that is lower than the maximum supply voltage. Certainly, if the foregoing voltage cannot meet a communication requirement, the maximum supply voltage may be further selected as the working voltage of the WiFi power amplifier.

S208. Determine whether the data is completely transmitted. If yes, go back to S201; or if no, go back to S202. If the data is completely transmitted, current transmission of the data ends, and S201 is performed again to determine whether there is data to be transmitted so as to perform data transmission for a next time. If the data is not completely transmitted, the transmit power of the WiFi power amplification circuit is re-determined according to a current channel status, so as to continue transmitting the unsent data according to the minimum supply voltage. In this embodiment of the present invention, a parity bit may be set in the transmitted data to determine whether the data is successfully transmitted, and a flag bit may be set at the tail of the data to determine whether the data is completely transmitted. Certainly, another method may be used, and this is not limited herein.

In this embodiment of the present invention, the method is applied to a WiFi communications system or a multi-rate communications system with orthogonal frequency division multiplexing modulation.

In conclusion, in the present invention, the minimum supply voltage that is for the WiFi power amplification circuit at the actual transmit power and that meets the WiFi communication rate is determined; and the working voltage is provided to the WiFi power amplification circuit to transmit data, where the working voltage is a voltage that is not lower than the minimum supply voltage and that is lower than the maximum supply voltage. The supply voltage for the power amplifier in the communications device can be dynamically adjusted according to the transmit power required by the communications device to transmit data, and power consumption of the communications system is reduced.

The foregoing descriptions are merely embodiments of the present invention, and the protection scope of the present invention is not limited thereto. All equivalent structure or process changes made according to the content of this specification and accompanying drawings in the present invention or by directly or indirectly applying the present invention in other related technical fields shall fall within the protection scope of the present invention.

The invention claimed is:

1. A method for reducing power consumption of a communications device, wherein the method comprises:
    detecting a received signal strength from a WiFi access point;
    detecting a WiFi communication rate used by the communications device to transmit data to the WiFi access point;
    determining an actual transmit power according to the received signal strength and the WiFi communication rate, wherein the WiFi communication rate comprises a modulation and coding scheme (MCS) index value, each WiFi communication rate of a plurality of WiFi communication rates stored in a voltage mapping table in the communications device corresponds to at least two different maximum transmit powers, and the at least two different maximum transmit powers separately correspond to different minimum supply voltages comprising:
        in response to detecting that the received signal strength has not changed from a previous received signal strength and detecting that the WiFi communication rate is greater than a previous WiFi communication rate, determining the actual transmit power to be less than a previous actual transmit power, wherein the previous actual transmit power, the previous WiFi communication rate, and the previous received signal strength belong to a previous operation point of the communications device;
    determining, based on the voltage mapping table, a minimum supply voltage that is for a WiFi power amplification circuit at the actual transmit power and that meets a WiFi communication rate; and
    providing a working voltage to the WiFi power amplification circuit to transmit data, wherein the working voltage is a voltage that is not lower than the minimum supply voltage and that is lower than a maximum supply voltage.

2. The method according to claim 1, wherein the determining a minimum supply voltage that is for a WiFi power amplification circuit at the actual transmit power and that meets a WiFi communication rate comprises:
    searching the voltage mapping table for the minimum supply voltage corresponding to the WiFi communication rate and the actual transmit power, wherein:
        the voltage mapping table records a one-to-one mapping relationship among the WiFi communication rate, a maximum transmit power, and the minimum supply voltage, and
        the maximum transmit power is a maximum transmit power that is defined by a WiFi communications protocol and that is implemented at the minimum supply voltage and the WiFi communication rate, and
    searching for the actual transmit power in the voltage mapping table is searching for the maximum transmit power same as the actual transmit power.

3. The method according to claim 2, wherein after the providing a working voltage to the WiFi power amplification circuit to transmit data, the method further comprises:
    determining whether the data is successfully transmitted, and if transmission fails, retransmitting the data by using the maximum supply voltage as an actual working voltage of the WiFi power amplification circuit.

4. The method according to claim 1, wherein the step of determining a minimum supply voltage that is for a WiFi power amplification circuit at the actual transmit power and that meets a WiFi communication rate is performed if a preset condition is met, and the preset condition is as follows:
    the communications device detects a data transmission request.

5. The method according to claim 1, further comprising:
    detecting a second received signal strength from the WiFi access point;
    detecting a second WiFi communication rate used by the communications device to transmit data to the WiFi access point; and
    determining a second actual transmit power according to the second received signal strength and the second WiFi communication rate comprising:
        in response to detecting that the second WiFi communication rate has not changed from a second previous WiFi communication rate and detecting that the second received signal strength is greater than a second previous received signal strength, determining the second actual transmit power to be less than the second previous actual transmit power, wherein the second previous actual transmit power, the second previous WiFi communication rate, and the second previous received signal strength belong to a second previous operation point of the communications device.

6. The method according to claim 5, wherein the determining the actual transmit power according to the received signal strength and the WiFi communication rate further comprises:
    finding a preset transmit power corresponding to the received signal strength and the WiFi communication rate from a power mapping table, and determining the preset transmit power as the actual transmit power, wherein in the power mapping table, each WiFi communication rate under a same received signal strength corresponds to one preset transmit power.

7. The method according to claim 1, wherein the WiFi communication rate is a physical layer rate of the communications device.

8. The method according to claim 1, wherein the working voltage is a voltage that is higher than the minimum supply voltage.

9. An apparatus for reducing power consumption of a communications device, wherein the apparatus comprises:
    at least one processor; and
    a non-transitory computer-readable storage medium coupled to the at least one processor and storing programming instructions for execution by the at least one processor, the programming instructions instruct the at least one processor to:

detect a received signal strength from a WiFi access point;

detect a WiFi communication rate used by the communications device to transmit data to the WiFi access point;

determine an actual transmit power according to the received signal strength and the WiFi communication rate, wherein the WiFi communication rate comprises a modulation and coding scheme (MCS) index value, each WiFi communication rate of a plurality of WiFi communication rates stored in a voltage mapping table in the communications device corresponds to at least two different maximum transmit powers, and the at least two different maximum transmit powers separately correspond to different minimum supply voltages comprising:

in response to detecting that the received signal strength has not changed from a previous received signal strength and detecting that the WiFi communication rate is greater than a previous WiFi communication rate, determine the actual transmit power to be less than a previous actual transmit power, wherein the previous actual transmit power, the previous WiFi communication rate, and the previous received signal strength belong to a previous operation point of the communications device;

determine, based on the voltage mapping table, a minimum supply voltage that is for a WiFi power amplification circuit at the actual transmit power and that meets a WiFi communication rate; and provide a working voltage to the WiFi power amplification circuit to transmit data, wherein the working voltage is a voltage that is not lower than the minimum supply voltage and that is lower than a maximum supply voltage.

10. The apparatus according to claim 9, wherein the non-transitory computer-readable storage medium stores the voltage mapping table, and the programming instructions instruct the at least one processor to:

search the voltage mapping table for the minimum supply voltage corresponding to the WiFi communication rate and the actual transmit power, wherein:

the voltage mapping table records a one-to-one mapping relationship among the WiFi communication rate, a maximum transmit power, and the minimum supply voltage, and the maximum transmit power is a maximum transmit power that is defined by a WiFi communications protocol and that can be implemented at the minimum supply voltage and the WiFi communication rate, and search for the actual transmit power in the voltage mapping table is searching for the maximum transmit power same as the actual transmit power.

11. The apparatus according to claim 10, wherein the programming instructions instruct the at least one processor to:

determine whether the data is successfully transmitted, and if transmission fails, retransmit the data by using the maximum supply voltage as an actual working voltage of the WiFi power amplification circuit.

12. The apparatus according to claim 9, wherein the programming instructions instruct the at least one processor to:

determine the minimum supply voltage that is for the WiFi power amplification circuit at the actual transmit power and that meets the WiFi communication rate is performed if a preset condition is met, and the preset condition is as follows:

detecting a data transmission request.

13. The apparatus according to 9, wherein the programming instructions instruct the at least one processor to:

detect a second received signal strength from the WiFi access point;

detect a second WiFi communication rate used by the communications device to transmit data to the WiFi access point; and determine a second actual transmit power according to the second received signal strength and the second WiFi communication rate comprising:

in response to detecting that the second WiFi communication rate has not changed from a second previous WiFi communication rate and detecting that the second received signal strength is greater than a second previous received signal strength, determine the second actual transmit power to be less than the second previous actual transmit power, wherein the second previous actual transmit power, the second previous WiFi communication rate, and the second previous received signal strength belong to a second previous operation point of the communications device.

14. The apparatus according to claim 13, wherein the programming instructions instruct the at least one processor to:

find a preset transmit power corresponding to the received signal strength and the WiFi communication rate from a power mapping table, and determine the preset transmit power as the actual transmit power of the WiFi power amplification circuit, wherein in the power mapping table, each data transmission rate under a same received signal strength corresponds to one preset transmit power.

15. A communications device, wherein the communications device comprises a WiFi circuit, the WiFi circuit comprises a WiFi power amplification circuit, a voltage source, and a WiFi chip, the WiFi chip is separately connected to the WiFi power amplification circuit and the voltage source, and the voltage source is connected to the WiFi power amplification circuit, and wherein the WiFi chip is configured to:

detect a received signal strength from a WiFi access point;

detect a WiFi communication rate used by the communications device to transmit data to the WiFi access point;

determine an actual transmit power according to the received signal strength and the WiFi communication rate, wherein the WiFi communication rate comprises a modulation and coding scheme (MCS) index value, each WiFi communication rate of a plurality of WiFi communication rates stored in a voltage mapping table in the communications device corresponds to at least two different maximum transmit powers, and the at least two different maximum transmit powers separately correspond to different minimum supply voltages comprising:

in response to detecting that the received signal strength has not changed from a previous received signal strength and detecting that the WiFi communication rate is greater than a previous WiFi communication rate, determine the actual transmit power to be less than a previous actual transmit power, wherein the previous actual transmit power, the previous WiFi communication rate, and the previous received signal strength belong to a previous operation point of the communications device;

determine, based on the voltage mapping table, a minimum supply voltage that is for the WiFi power amplification circuit at the actual transmit power and that meets a WiFi communication rate; and control the voltage source to provide a working voltage to the WiFi power amplification circuit to transmit data, wherein the working voltage is a voltage that is not lower than the minimum supply voltage and that is lower than a maximum supply voltage.

16. The communications device according to claim 15, wherein the WiFi chip is configured to:

search the voltage mapping table for the minimum supply voltage corresponding to the WiFi communication rate and the actual transmit power, wherein:

the voltage mapping table records a one-to-one mapping relationship among the WiFi communication rate, a maximum transmit power, and the minimum supply voltage, and the maximum transmit power is a maximum transmit power that is defined by a WiFi communications protocol and that can be implemented at the minimum supply voltage and the WiFi communication rate, and search for the actual transmit power in the voltage mapping table is searching for the maximum transmit power same as the actual transmit power.

17. The communications device according to claim 15, wherein the WiFi chip is further configured to:

find a preset transmit power corresponding to the received signal strength and the WiFi communication rate from a power mapping table; and determine the preset transmit power as the actual transmit power of the WiFi power amplification circuit, wherein in the power mapping table, each WiFi communication rate under a same received signal strength corresponds to one preset transmit power.

* * * * *

UNITED STATES PATENT AND TRADEMARK OFFICE
CERTIFICATE OF CORRECTION

| | |
|---|---|
| PATENT NO. | : 10,932,194 B2 |
| APPLICATION NO. | : 16/067211 |
| DATED | : February 23, 2021 |
| INVENTOR(S) | : Tongbo Wang |

It is certified that error appears in the above-identified patent and that said Letters Patent is hereby corrected as shown below:

In the Claims

In Column 20, Line 10, in Claim 13, delete "to" and insert -- to claim --, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*